(12) United States Patent
Shobayashi et al.

(10) Patent No.: US 11,320,630 B2
(45) Date of Patent: May 3, 2022

(54) LENS SYSTEM, INTERCHANGEABLE LENS DEVICE, AND CAMERA SYSTEM

(71) Applicant: Panasonic Intellectual Property Management Co., Ltd., Osaka (JP)

(72) Inventors: Hiroyuki Shobayashi, Hyogo (JP); Yoshio Matsumura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 146 days.

(21) Appl. No.: 16/542,303

(22) Filed: Aug. 16, 2019

(65) Prior Publication Data

US 2019/0369364 A1 Dec. 5, 2019

Related U.S. Application Data

(63) Continuation of application No. PCT/JP2018/006345, filed on Feb. 22, 2018.

(30) Foreign Application Priority Data

Mar. 10, 2017 (JP) .............................. JP2017-045809

(51) Int. Cl.
*G02B 13/00* (2006.01)
*G02B 9/12* (2006.01)
*G03B 17/14* (2021.01)

(52) U.S. Cl.
CPC ........... *G02B 13/0035* (2013.01); *G02B 9/12* (2013.01); *G02B 13/004* (2013.01); *G03B 17/14* (2013.01)

(58) Field of Classification Search
CPC .... G02B 13/0035; G02B 13/004; G02B 9/58; G02B 13/04; G02B 9/12–32;
(Continued)

(56) References Cited

U.S. PATENT DOCUMENTS

| 5,446,581 A | 8/1995 | Jamieson |
| 2007/0091458 A1* | 4/2007 | Asami ................ G02B 13/0035 359/680 |

(Continued)

FOREIGN PATENT DOCUMENTS

| JP | 11-326757 | 11/1999 |
| JP | 2010-128100 | 6/2010 |

(Continued)

OTHER PUBLICATIONS

International Search Report of PCT application No. PCT/JP2018/006345 dated May 22, 2018.

*Primary Examiner* — Marin Pichler
*Assistant Examiner* — Alberto J Betancourt
(74) *Attorney, Agent, or Firm* — McDermott Will & Emery LLP

(57) ABSTRACT

A lens system includes, in order from an object side to an image plane side: a first lens element having a negative power; a second lens element whose concave surface faces the object side; and a third lens element having a positive power, and satisfies conditions (1) and (2).

$$0.205 < |(TL1/TA) \cdot \tan(\omega)| \qquad (1)$$

$$0.120 < IH/TA < 0.170 \qquad (2)$$

where
TL1 is a central thickness of the first lens element,
TA is a total optical length,
ω is a half angle of view, and
IH is an image height of the lens system.

1 Claim, 15 Drawing Sheets

(58) Field of Classification Search
CPC .............. G02B 15/143; G02B 15/1435; G02B 15/143505; G02B 15/143507; G02B 15/144507; G02B 15/144515; G03B 17/14
USPC ................ 359/716, 682, 689–690, 748, 753, 359/784–792
See application file for complete search history.

(56) References Cited

U.S. PATENT DOCUMENTS

| | | |
|---|---|---|
| 2008/0106809 A1 | 5/2008 | Hirano |
| 2010/0118416 A1 | 5/2010 | Do |
| 2011/0128637 A1* | 6/2011 | Kubota .................. G02B 13/04 359/784 |
| 2011/0242683 A1* | 10/2011 | Yamakawa ............ G02B 13/04 359/715 |
| 2011/0261472 A1 | 10/2011 | Yamakawa |
| 2011/0286112 A1* | 11/2011 | Orihara .............. G02B 13/0035 359/716 |
| 2012/0224268 A1 | 9/2012 | Takato |
| 2016/0235282 A1 | 8/2016 | Nakamura |
| 2016/0320688 A1 | 11/2016 | Sakagami |
| 2018/0011292 A1* | 1/2018 | Lai .......................... G02B 9/12 |

FOREIGN PATENT DOCUMENTS

| | | |
|---|---|---|
| JP | 2011-164237 | 8/2011 |
| JP | 2011-232418 | 11/2011 |
| JP | 2012-230434 | 11/2012 |
| JP | 2012-234099 | 11/2012 |
| JP | 2013-008049 | 1/2013 |
| JP | 2013-228427 | 11/2013 |
| JP | 2013-228539 | 11/2013 |
| JP | 2014-106389 A | 6/2014 |
| JP | 2015-011050 | 1/2015 |
| JP | 2016-038574 | 3/2016 |
| JP | 2016-045224 A | 4/2016 |
| WO | 2008/142809 A1 | 11/2008 |
| WO | 2015/159770 | 10/2015 |

* cited by examiner

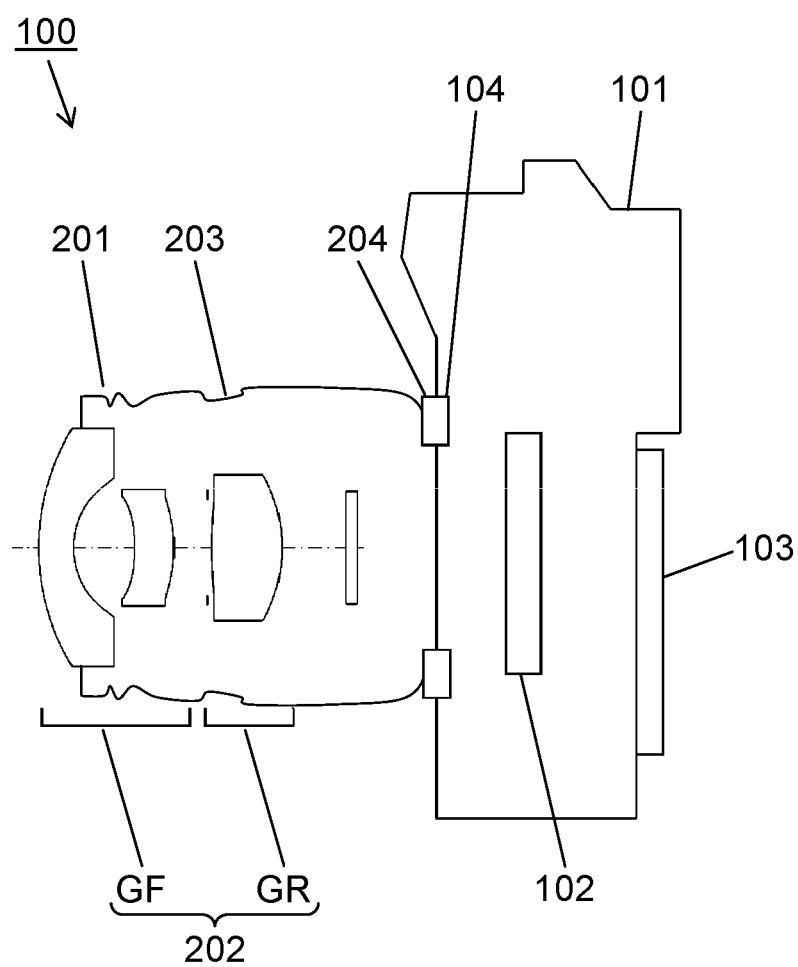

LENS SYSTEM, INTERCHANGEABLE LENS DEVICE, AND CAMERA SYSTEM

TECHNICAL FIELD

The present disclosure relates to a lens system, an interchangeable lens device, and a camera system.

BACKGROUND ART

Camera systems have rapidly prevailed in recent years for their advantages that they have high sensitivity and can capture high quality images, in addition, high-speed image processing is possible after focusing or imaging. Further, a camera system using infrared light is used for capturing images at night.

PTL 1 discloses an optical system for infrared light that includes, in order from an object side to an image side: a first lens having a negative power; a second lens having a positive power; a diaphragm; and a third lens having a negative power.

PTL 2 discloses a wide-angle lens system that includes, in order from an object side to an image side: a first lens having a negative power; a second lens having a positive power; a diaphragm; a third lens having a positive power; and a fourth lens having a negative power.

CITATION LIST

Patent Literature

PTL 1: Unexamined Japanese Patent Publication No. 2013-228539
PTL 2: Unexamined Japanese Patent Publication No. 2013-8049

SUMMARY

The present disclosure provides a lens system that is small-sized and whose aberrations are well corrected. Further, the present disclosure provides an interchangeable lens device and a camera system both including the lens system.

A lens system in the present disclosure includes, in order from an object side to an image plane side: a first lens element having a negative power; a second lens element whose concave surface faces the object side; and a third lens element having a positive power, and satisfies the following conditions (1) and (2).

$$0.205 < |(TL1/TA) \cdot \tan(\omega)| \quad (1)$$

$$0.120 < IH/TA < 0.170 \quad (2)$$

where
TL1 is a central thickness of the first lens element,
TA is a total optical length,
$\omega$ is a half angle of view, and
IH is an image height of the lens system.

Further, an interchangeable lens device in the present disclosure includes the above lens system, and a lens-side mount that is configured to connect to a camera body. The camera body includes an imaging device that receives an optical image formed by the lens system to convert the optical image into an electric image signal.

Further, a camera system in the present disclosure includes: the interchangeable lens device including the above lens system; and the camera body that is detachably connected to the interchangeable lens device via a camera-side mount.

The present disclosure realizes a lens system that is small-sized and whose aberrations are well corrected. Further, the present disclosure realizes an interchangeable lens device and a camera system both including the lens system.

BRIEF DESCRIPTION OF DRAWINGS

FIG. 15 is a configuration diagram of a camera system mounted with the lens system of the first exemplary embodiment.

DESCRIPTION OF EMBODIMENTS

Hereinafter, exemplary embodiments will be described in detail with reference to the drawings as appropriate. However, an unnecessarily detailed description will be omitted in some cases. For example, a detailed description of a well-known matter and a duplicated description of substantially the same configuration will be omitted in some cases. This is to avoid the following description from being unnecessarily redundant and thus to help those skilled in the art to easily understand the description. Note that the inventors provide the accompanying drawings and the following description to help those skilled in the art to sufficiently understand the present disclosure, and do not intend to use the drawings or the description to limit the subject matter described in the claims.

FIGS. 1, 3, 5, 7, 9, 11, and 13 are respectively lens arrangement diagrams of lens systems according to first to seventh exemplary embodiments, and show the lens systems in an infinity focusing state. Note that the lens systems of the present disclosure are far-infrared optical systems suitable to form an image of far-infrared light in a wavelength range of 8 µm to 12 µm. In each diagram, the straight line depicted on the rightmost side represents a position of image plane S. In addition, in each drawing, parallel plate P is disposed between the lens element disposed on the most image plane side and image plane S.

First Exemplary Embodiment

Figure 1:
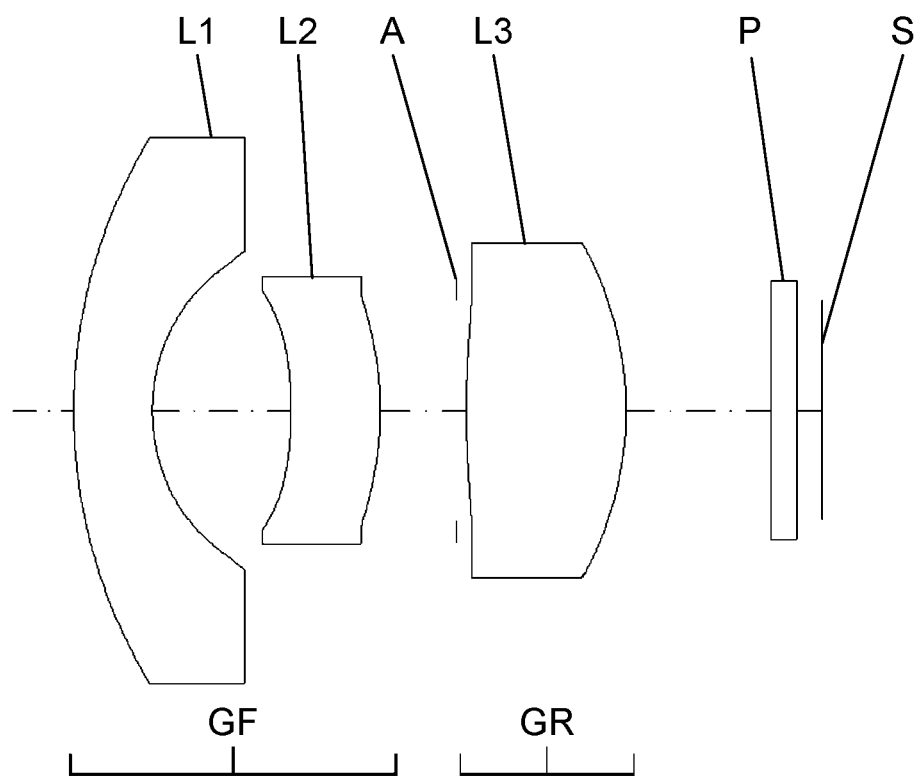
FIG. 1 is a lens arrangement diagram showing a lens system according to a first exemplary embodiment (a first numerical example) in an infinity focusing state.
Figure 2:
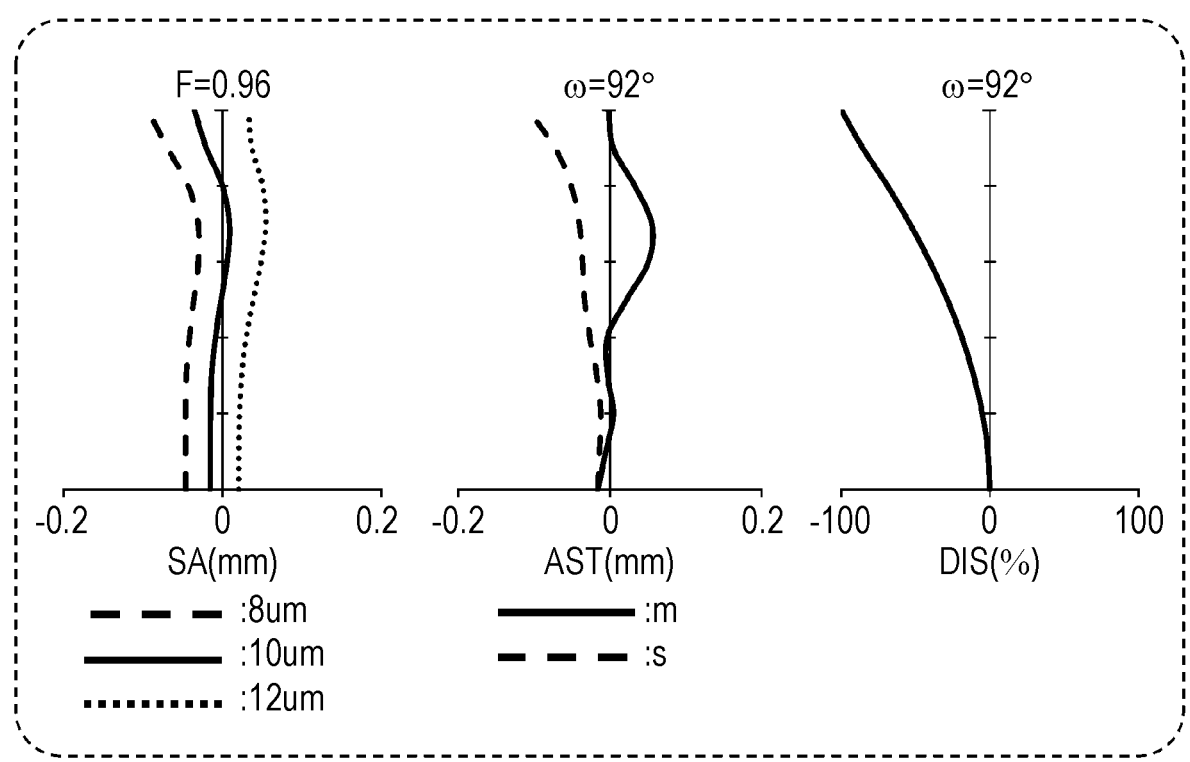
FIG. 2 is a longitudinal aberration diagram of the lens system according to the first numerical example in an infinity focusing state.

FIG. 1 is a sectional view of a lens system according to a first exemplary embodiment of the present disclosure. As shown in FIG. 1, the lens system is constituted by, in order from an object side to an image plane side: front group GF; aperture stop A; and rear group GR. Front group GF is constituted by: first lens element L1 having a negative meniscus shape whose convex surface faces the object side; and second lens element L2 having a positive meniscus shape whose concave surface faces the object side. Rear group GR is constituted by third lens element L3 having a biconvex shape. First lens element L1 has an aspherical surface on the image plane side. Second lens element L2 has aspherical surfaces on both sides. Third lens element L3 has aspherical surfaces on both sides. At a time of focusing, first lens element L1 to third lens element L3 integrally move toward the image plane side in an optical axis direction.

Second Exemplary Embodiment

Figure 3:
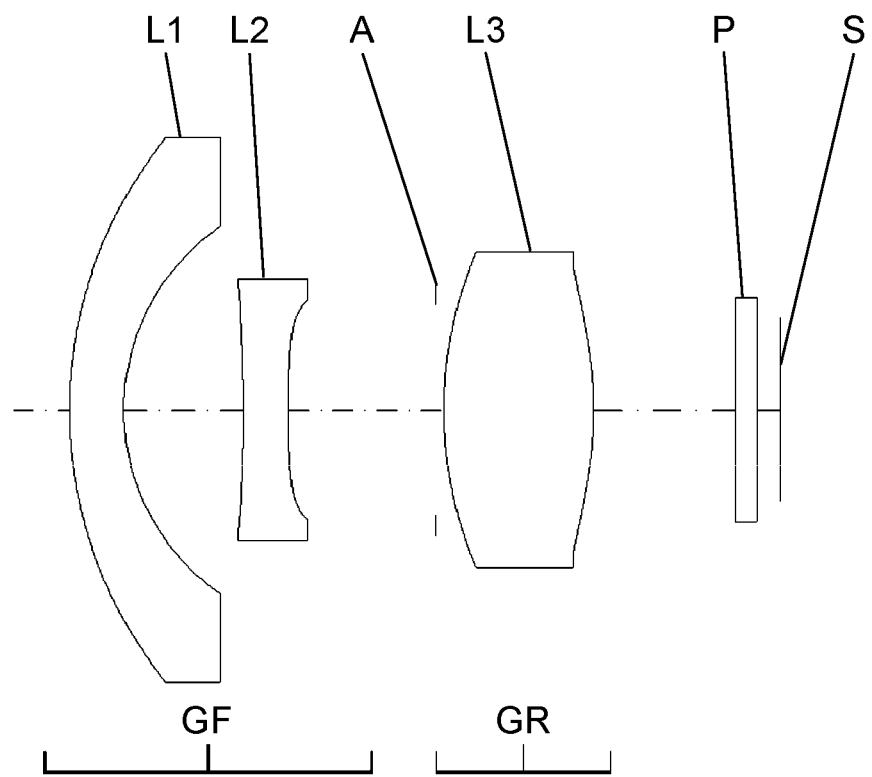
FIG. 3 is a lens arrangement diagram showing a lens system according to a second exemplary embodiment (a second numerical example) in an infinity focusing state.
Figure 4:
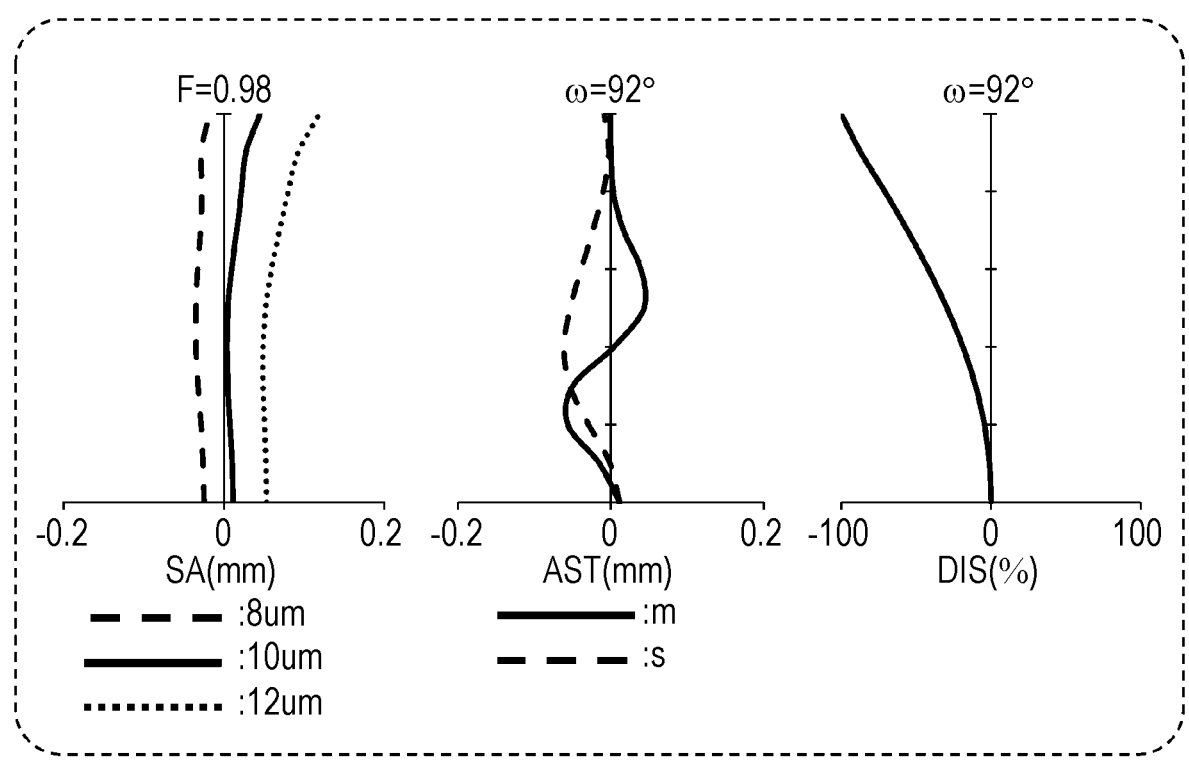
FIG. 4 is a longitudinal aberration diagram of the lens system according to the second numerical example in an infinity focusing state.

FIG. 3 is a sectional view of a lens system according to a second exemplary embodiment of the present disclosure. As shown in FIG. 3, the lens system is constituted by, in order from an object side to an image plane side: front group GF; aperture stop A; and rear group GR. Front group GF is constituted by: first lens element L1 having a negative meniscus shape whose convex surface faces the object side; and second lens element L2 having a biconcave shape. Rear group GR is constituted by third lens element L3 having a biconvex shape. Second lens element L2 has an aspherical surface on the image plane side. Third lens element L3 has aspherical surfaces on both sides. At a time of focusing, first lens element L1 to third lens element L3 integrally move toward the image plane side in an optical axis direction.

Third Exemplary Embodiment

Figure 5:
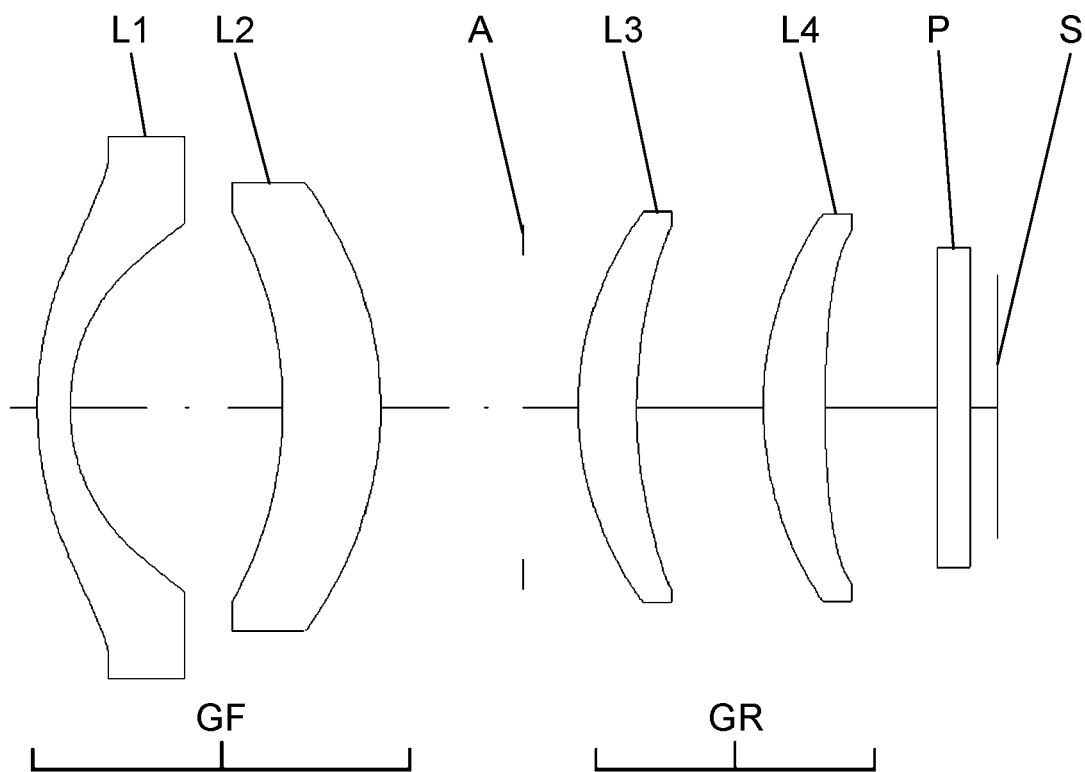
FIG. 5 is a lens arrangement diagram showing a lens system according to a third exemplary embodiment (a third numerical example) in an infinity focusing state.
Figure 6:
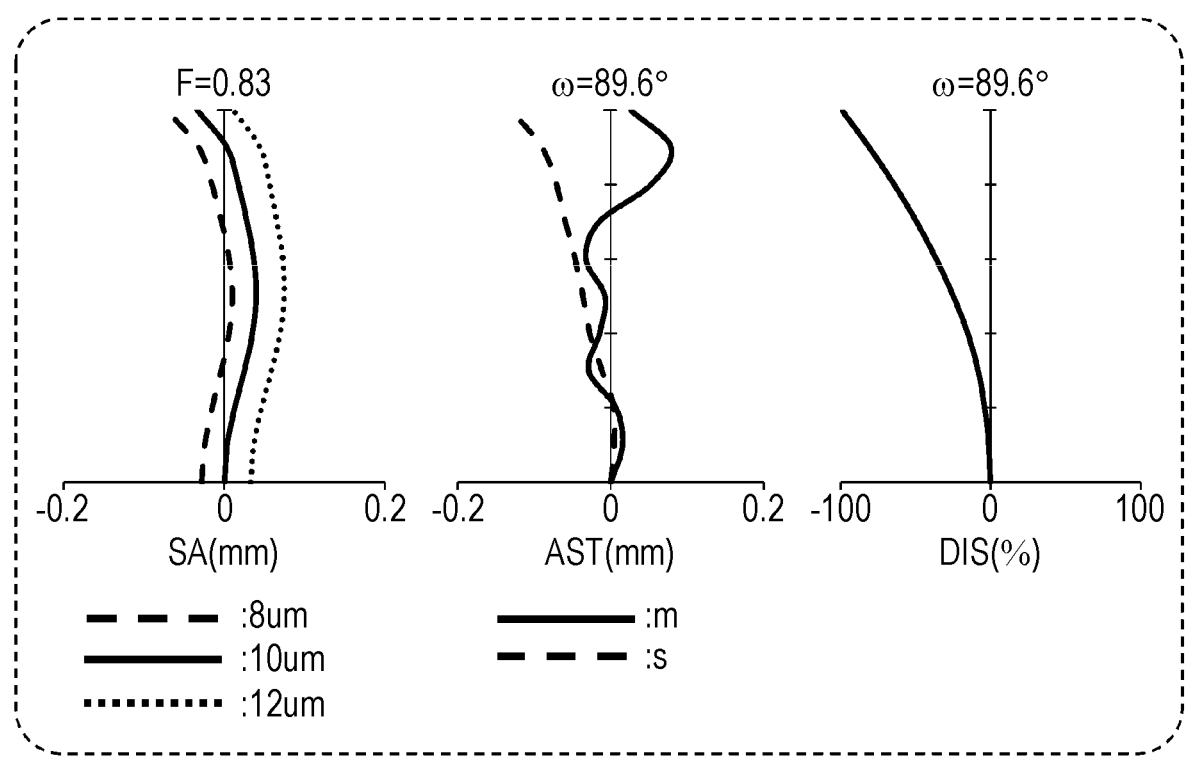
FIG. 6 is a longitudinal aberration diagram of the lens system according to the third numerical example in an infinity focusing state.

FIG. 5 is a sectional view of a lens system according to a third exemplary embodiment of the present disclosure. As shown in FIG. 5, the lens system is constituted by, in order from an object side to an image plane side: front group GF; aperture stop A; and rear group GR. Front group GF is constituted by: first lens element L1 having a negative meniscus shape whose convex surface faces the object side; and second lens element L2 having a positive meniscus shape whose concave surface faces the object side. Rear group GR is constituted by: third lens element L3 having a positive meniscus shape whose convex surface faces the object side; and fourth lens element L4 having a positive meniscus shape whose convex surface faces the object side. First lens element L1 has an aspherical surface on the image plane side. Third lens element L3 has an aspherical surface on the object side. Fourth lens element L4 has an aspherical surface on the image plane side. At a time of focusing, first lens element L1 to fourth lens element L4 integrally move toward the image plane side in an optical axis direction.

Fourth Exemplary Embodiment

Figure 7:
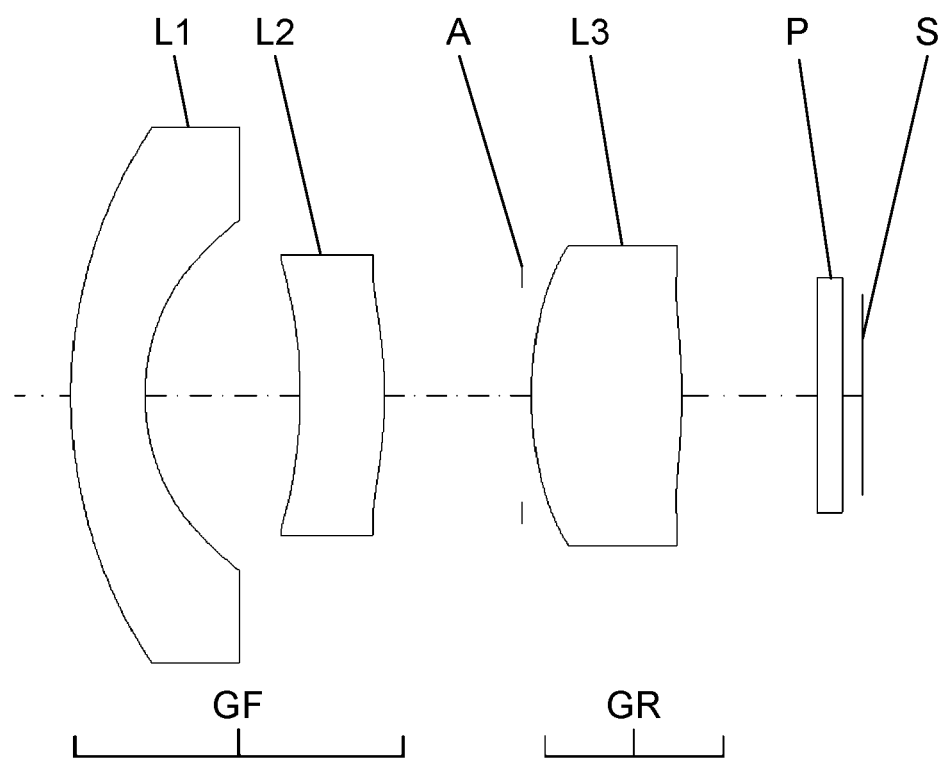
FIG. 7 is a lens arrangement diagram showing a lens system according to a fourth exemplary embodiment (a fourth numerical example) in an infinity focusing state.
Figure 8:
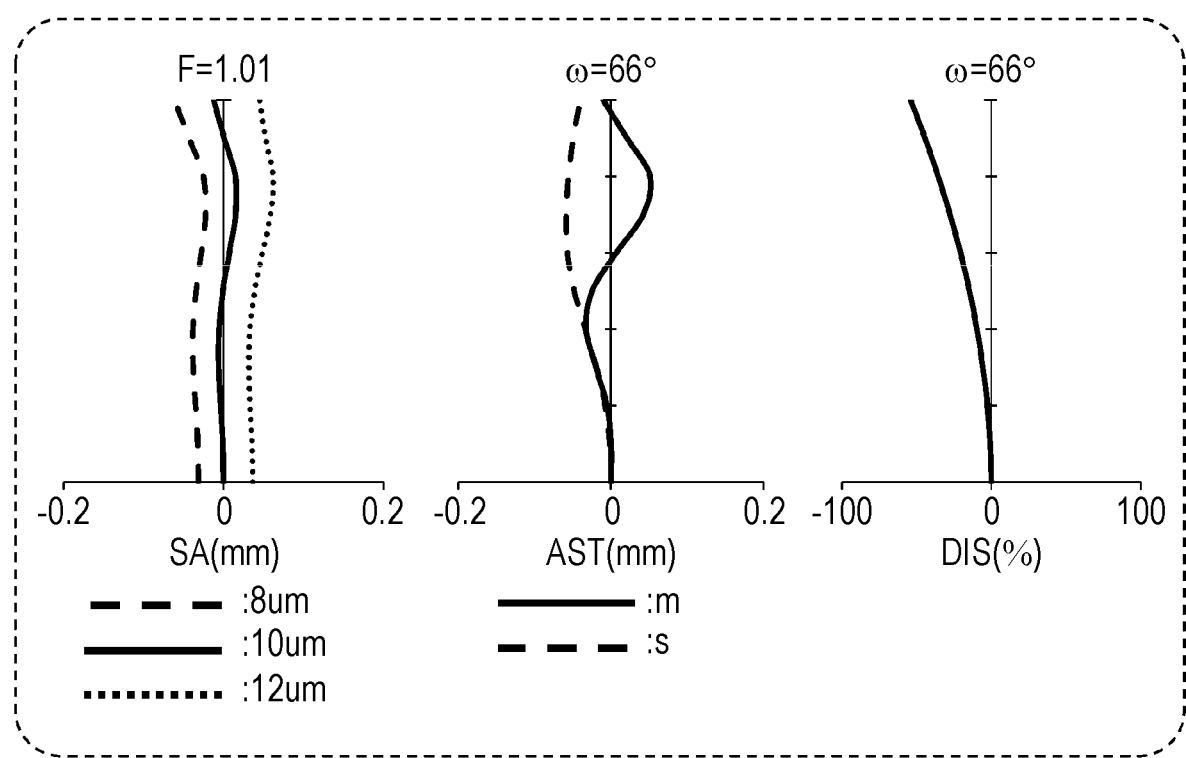
FIG. 8 is a longitudinal aberration diagram of the lens system according to the fourth numerical example in an infinity focusing state.

FIG. 7 is a sectional view of a lens system according to a fourth exemplary embodiment of the present disclosure. As shown in FIG. 7, the lens system is constituted by, in order from an object side to an image plane side: front group GF; aperture stop A; and rear group GR. Front group GF is constituted by: first lens element L1 having a negative meniscus shape whose convex surface faces the object side; and second lens element L2 having a positive meniscus shape whose concave surface faces the object side. Rear group GR is constituted by third lens element L3 having a biconvex shape. First lens element L1 has an aspherical surface on the image plane side. Second lens element L2 has an aspherical surface on the image plane side. Third lens element L3 has aspherical surfaces on both sides. At a time of focusing, first lens element L1 to third lens element L3 integrally move toward the image plane side in an optical axis direction.

Fifth Exemplary Embodiment

Figure 9:
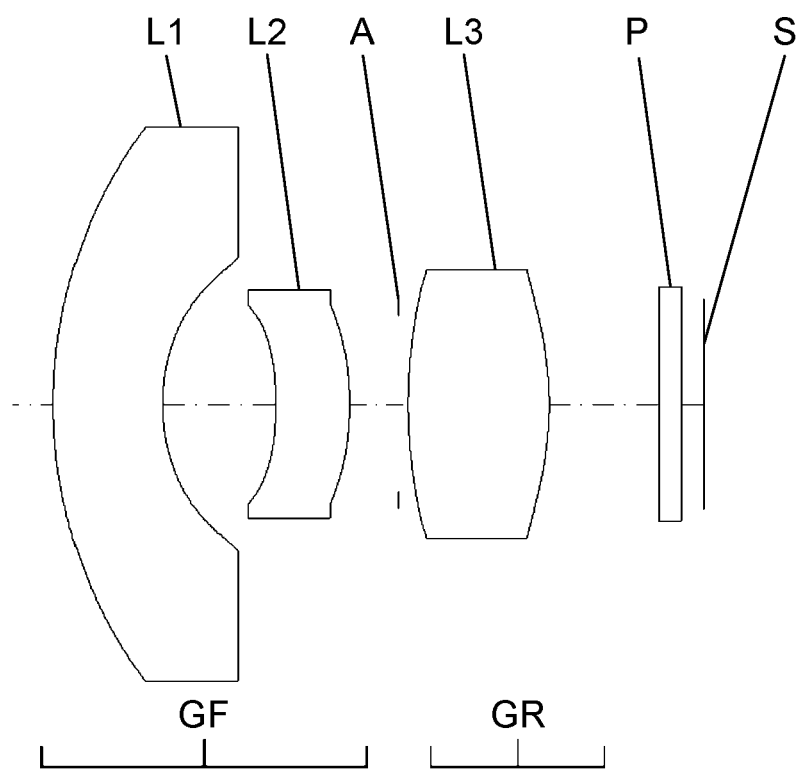
FIG. 9 is a lens arrangement diagram showing a lens system according to a fifth exemplary embodiment (a fifth numerical example) in an infinity focusing state.
Figure 10:
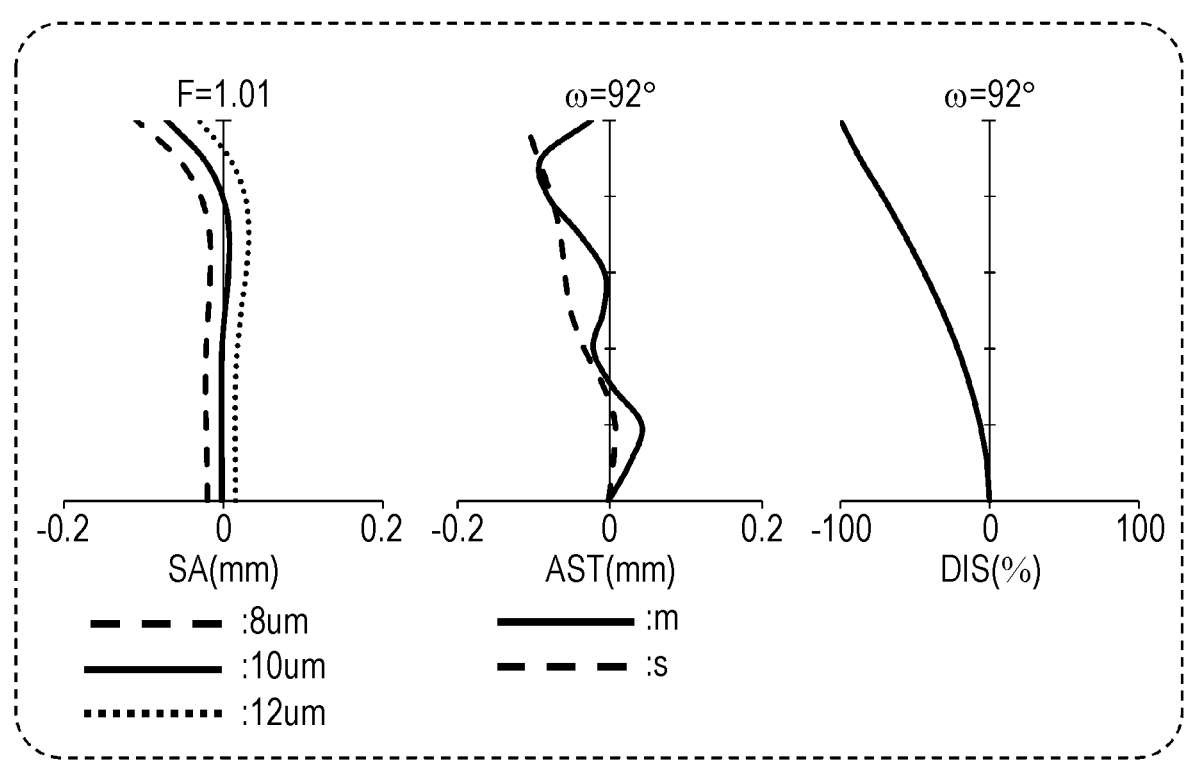
FIG. 10 is a longitudinal aberration diagram of the lens system according to the fifth numerical example in an infinity focusing state.

FIG. 9 is a sectional view of a lens system according to a fifth exemplary embodiment of the present disclosure. As shown in FIG. 9, the lens system is constituted by, in order from an object side to an image plane side: front group GF; aperture stop A; and rear group GR. Front group GF is constituted by: first lens element L1 having a negative meniscus shape whose convex surface faces the object side; and second lens element L2 having a positive meniscus shape whose concave surface faces the object side. Rear group GR is constituted by third lens element L3 having a biconvex shape. First lens element L1 has an aspherical surface on the image plane side. Second lens element L2 has aspherical surfaces on both sides. Third lens element L3 has aspherical surfaces on both sides. At a time of focusing, first lens element L1 to third lens element L3 integrally move toward the image plane side in an optical axis direction.

Sixth Exemplary Embodiment

Figure 11:
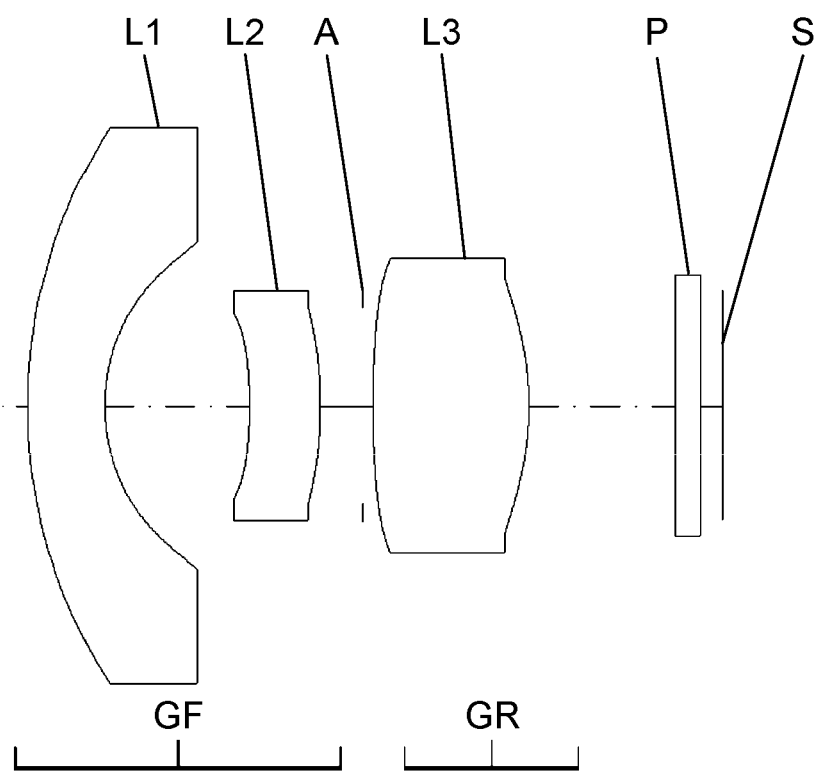
FIG. 11 is a lens arrangement diagram showing a lens system according to a sixth exemplary embodiment (a sixth numerical example) in an infinity focusing state.
Figure 12:
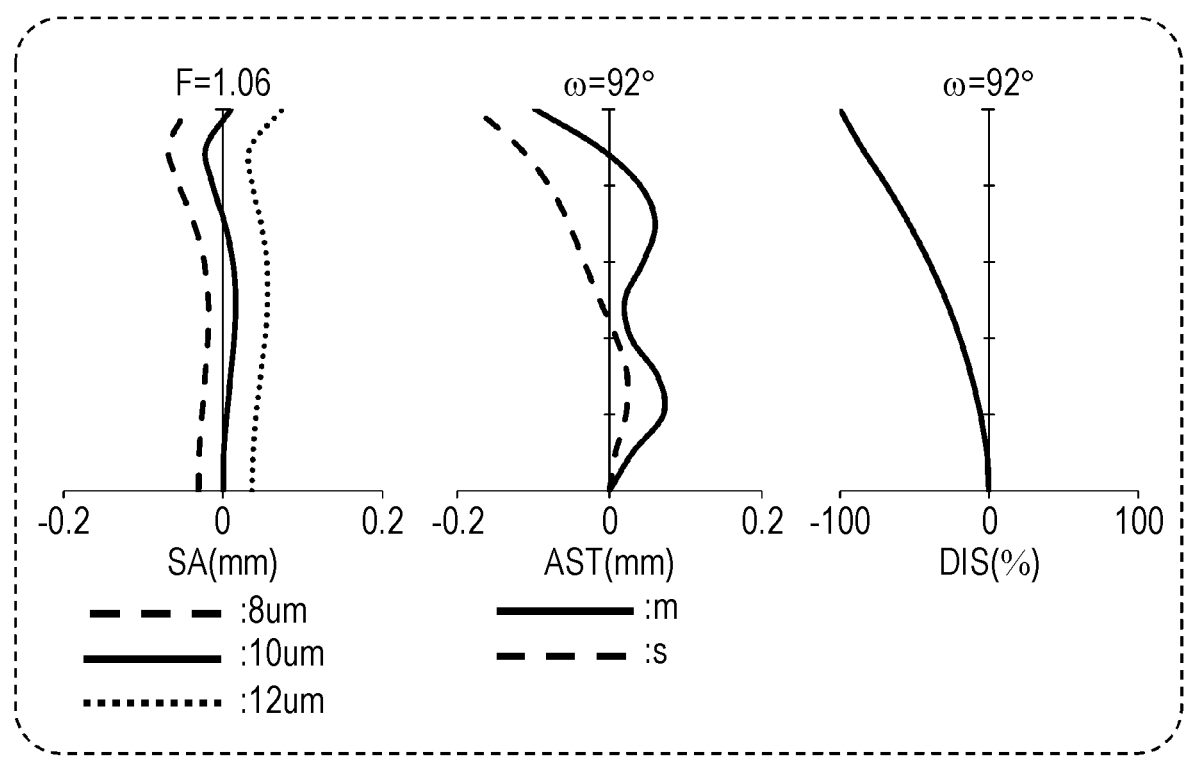
FIG. 12 is a longitudinal aberration diagram of the lens system according to the sixth numerical example in an infinity focusing state.

FIG. 11 is a sectional view of a lens system according to a sixth exemplary embodiment of the present disclosure. As shown in FIG. 11, the lens system is constituted by, in order from an object side to an image plane side: front group GF; aperture stop A; and rear group GR. Front group GF is constituted by: first lens element L1 having a negative meniscus shape whose convex surface faces the object side; and second lens element L2 having a positive meniscus shape whose concave surface faces the object side. Rear group GR is constituted by third lens element L3 having a biconvex shape. First lens element L1 has an aspherical surface on the image plane side. Second lens element L2 has aspherical surfaces on both sides. Third lens element L3 has aspherical surfaces on both sides. At a time of focusing, first lens element L1 to third lens element L3 integrally move toward the image plane side in an optical axis direction.

Seventh Exemplary Embodiment

Figure 13:
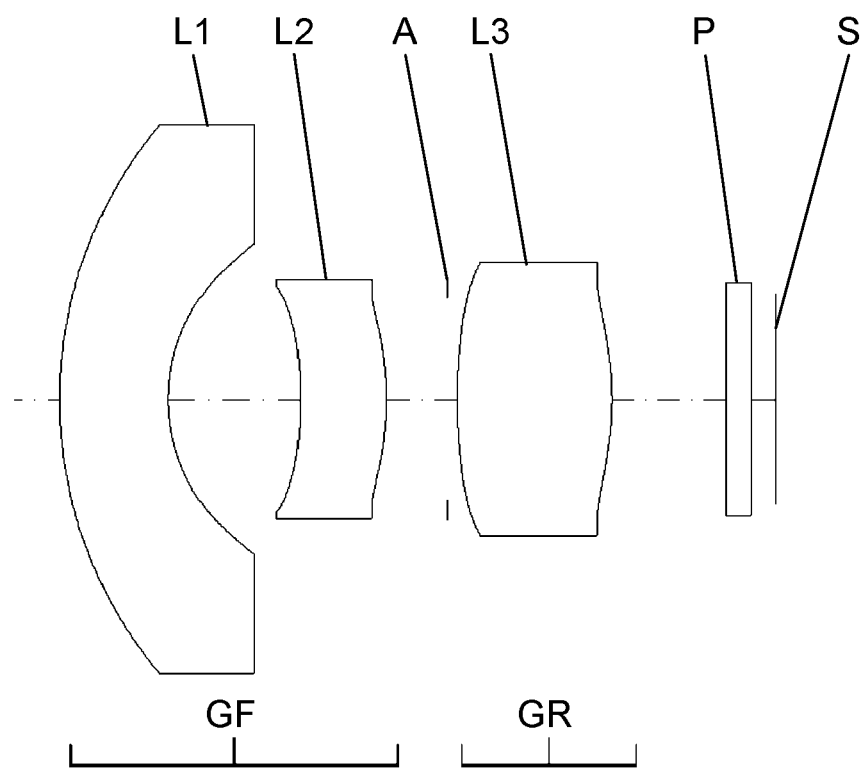
FIG. 13 is a lens arrangement diagram showing a lens system according to a seventh exemplary embodiment (a seventh numerical example) in an infinity focusing state.
Figure 14:
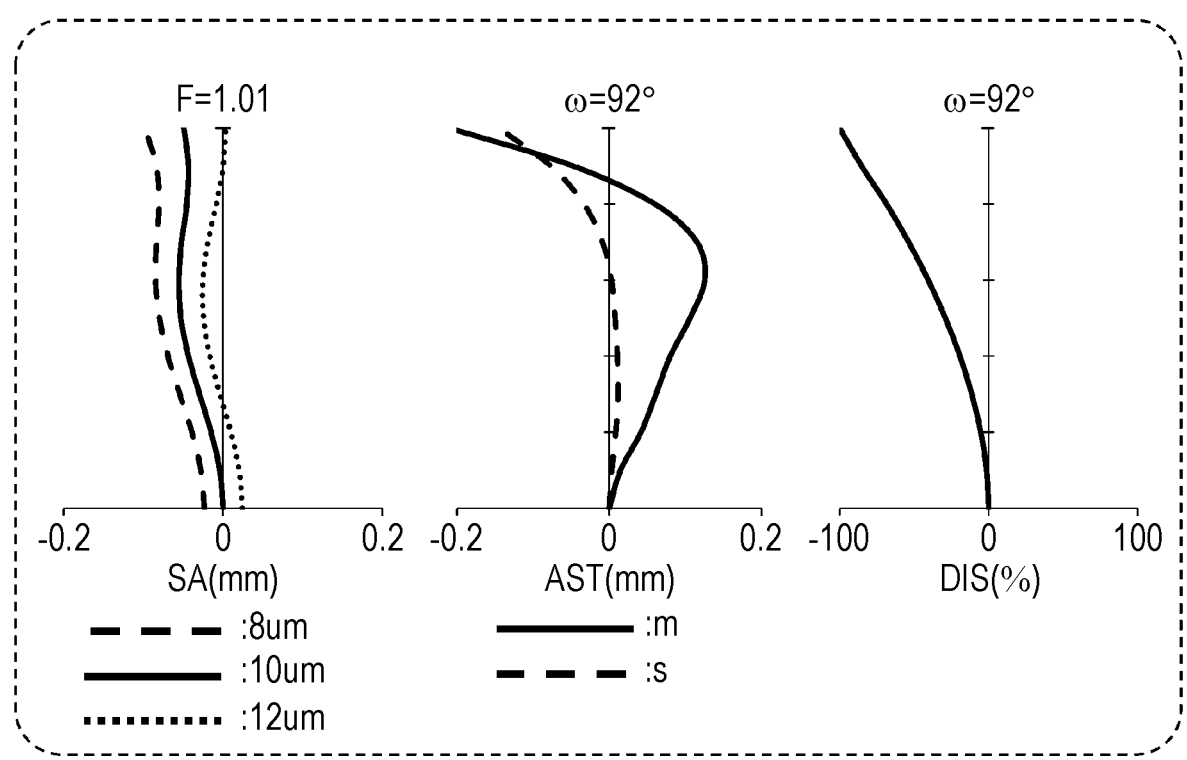
FIG. 14 is a longitudinal aberration diagram of the lens system according to the seventh numerical example in an infinity focusing state.

FIG. 13 is a sectional view of a lens system according to a seventh exemplary embodiment of the present disclosure.

As shown in FIG. 13, the lens system is constituted by, in order from an object side to an image plane side: front group GF; aperture stop A; and rear group GR. Front group GF is constituted by: first lens element L1 having a negative meniscus shape whose convex surface faces the object side; and second lens element L2 having a positive meniscus shape whose concave surface faces the object side. Rear group GR is constituted by third lens element L3 having a biconvex shape. First lens element L1 has an aspherical surface on the image plane side. Second lens element L2 has aspherical surfaces on both sides. Third lens element L3 has aspherical surfaces on both sides. At a time of focusing, first lens element L1 to third lens element L3 integrally move toward the image plane side in an optical axis direction.

As described above, each of the lens systems according to the first to seventh exemplary embodiments includes, in order from an object side to an image plane side: front group GF; aperture stop A disposed on the image plane side with respect to front group GF; and rear group GR disposed on the image plane side with respect to aperture stop A. Since aperture stop A is disposed between front group GF and rear group GR as described above, a light beam entering rear group is kept low. This arrangement can prevent or reduce coma aberration. In addition, since first lens element L1 has a negative power, the optical system can have a wider angle of view. Further, since the object side surface of second lens element L2 is made concave toward the object side, spherical aberration and coma aberration can be well corrected.

As a material for first lens elements L1 of the first to fourth and sixth exemplary embodiments, chalcogenide glass is used. This arrangement can lower surface reflectance for a light beam entering the first lens element, and can keep a curvature of the first lens element small. At the same time, this arrangement can provide an image that is bright even in a peripheral area.

Hereinafter, a description will be given on conditions that can be satisfied by such a lens system as, for example, the lens systems according to the first to seventh exemplary embodiments. Note that a plurality of possible conditions are set for the lens systems according to the exemplary embodiments, and a configuration of an lens system satisfying all of the conditions is the most effective. However, by satisfying each condition, it is also possible to obtain a lens system providing an effect corresponding to each condition.

For example, the lens system according to one of the first to seventh exemplary embodiments includes, in order from an object side to an image plane side: front group GF; aperture stop A disposed on the image plane side with respect to front group GF; and rear group GR disposed on the image plane side with respect to aperture stop A. Front group GF has: first lens element L1 that is disposed on the most object side and has a negative power; and second lens element L2 whose object side surface is concave toward the object side. Rear group GR has third lens element L3 having a positive power. A configuration of such a lens system (the configuration is referred to as a basic configuration of the exemplary embodiment) satisfies the following condition (1).

$$0.205 < |(TL1/TA) \cdot \tan(\omega)| \tag{1}$$

where
TL1 is a central thickness of the first lens element,
TA is a total optical length, and
ω is a half angle of view.

The condition (1) prescribes ratios of a central thickness of first lens element L1 to a total optical length and a tangent of the half angle of view. Since a lens system according to one of the first to seventh exemplary embodiments satisfies the condition (1), the lens system can have a wide angle of view, and at the same time, an optical performance is well maintained, so that a total lens length is shortened. If a lower limit of the condition (1) is exceeded, it is difficult to achieve miniaturization and a wider angle of the lens system.

In addition, if the following condition (1)' is satisfied, the above effect is better achieved.

$$1 < |(TL1/TA) \cdot \tan(\omega)| \tag{1'}$$

The lens system according to one of the first to seventh exemplary embodiments satisfies the following condition (2).

$$0.120 < IH/TA < 0.170 \tag{2}$$

where
IH is an image height of the lens system.

The condition (2) prescribes a ratio of the image height of the lens system to the total optical length. Since the lens system according to one of the first to seventh exemplary embodiments satisfies the condition (2), a power of the lens system can be appropriately set, so that field curvature is well corrected, and at the same time, the lens system can be miniaturized. If an upper limit of the condition (2) is exceeded, the power of the lens system is so strong that it is difficult to prevent or reduce occurrence of field curvature. On the other hand, if a lower limit of the condition (2) is exceeded, it is difficult to achieve miniaturization of the lens system. In addition, since the image height of the lens system is low, a pixel number of an image obtained when a photographing system is configured decreases; therefore, it is necessary to make the lens system larger to obtain a comparable pixel number.

In addition, if the following condition (2)' is satisfied, the above effect is better achieved.

$$0.125 < IH/TA < 0.165 \tag{2'}$$

The lens system according to one of the first to seventh exemplary embodiments preferably satisfies the following condition (3).

$$2.0 < n < 3.25 \tag{3}$$

where
n is a refractive index of the first lens element for a wavelength of 10 μm.

The condition (3) specifies the refractive index of first lens element L1. If the lens system according to one of the first to seventh exemplary embodiments satisfies the condition (3), a power arrangement of the lens system can be appropriately set, so that the lens system can have a wide angle of view and can provide a bright image. If an upper limit of the condition (3) is exceeded, a reflectance on the lens element surface becomes high, and an obtained image becomes dark. On the other hand, if a lower limit of the condition (3) is exceeded, light of far-infrared wavelengths is absorbed in the lens element, and an obtained image becomes dark.

In addition, if the following condition (3)' is satisfied, the above effect is better achieved.

$$2.3 < n < 2.6 \tag{3'}$$

The lens system according to one of the first to seventh exemplary embodiments preferably satisfies the following condition (4).

$$0.34 < IH/L1SD < 0.60 \tag{4}$$

where
L1SD is an effective diameter of the first lens element.

The condition (4) specifies the image height of the lens system and the effective diameter of first lens element L1. If the lens system according to one of the first to seventh exemplary embodiments satisfies the condition (4), a power of the lens system can be appropriately set, and first lens element L1, which tends to be large, can be miniaturized. If an upper limit of the condition (4) is exceeded, the power of first lens element L1 becomes so strong that it is difficult to control field curvature. On the other hand, if a lower limit of the condition (4) is exceeded, the power of first lens element L1 becomes so weak that it is difficult to miniaturize first lens element L1. In addition, since the image height of the lens system is low, a pixel number of an image obtained when a photographing system is configured decreases; therefore, it is necessary to make the lens system larger to obtain a comparable pixel number.

In addition, if the following condition (4)' is satisfied, the above effect is better achieved.

$$0.35 < IH/L1SD < 0.55 \quad (4)'$$

The lens system according to one of the first to seventh exemplary embodiments preferably satisfies the following condition (5).

$$1.50 < BF/f < 2.40 \quad (5)$$

where

BF is a back focus, and f is a focal length of an entire lens system.

The condition (5) prescribes a ratio of the back focus of the lens system to the focal length of the entire lens system. If the lens system according to one of the first to seventh exemplary embodiments satisfies the condition (5), spherical aberration is well corrected, and at the same time, a back focus can be secured. If an upper limit of the condition (5) is exceeded, the power of the lens system becomes so strong that it is difficult to control spherical aberration. On the other hand, if a lower limit of the condition (5) is exceeded, the power of lens system becomes so weak that it is difficult to achieve a wider angle. Further, the back focus is too short to secure an appropriate flange back.

In addition, if the following condition (5)' is satisfied, the above effect is better achieved.

$$1.60 < BF/f < 2.30 \quad (5)'$$

The lens system according to one of the first to seventh exemplary embodiments preferably satisfies the following condition (6).

$$7 < |(TA/L2R1) \cdot \tan(\omega)| \quad (6)$$

where

L2R1 is a radius of curvature of an object side surface of the second lens element.

The condition (6) prescribes ratios of the total optical length to the radius of curvature of the object side surface of second lens element L2 and a tangent of the half angle of view. If the lens system according to one of the first to seventh exemplary embodiments satisfies the condition (6), spherical aberration and coma aberration are well corrected, and at the same time, a wide angle of view can be obtained. On the other hand, if a lower limit of the condition (6) is exceeded, the power of second lens element L2 becomes so small that it is difficult to achieve a wider angle. In addition, it is difficult to control spherical aberration and coma aberration.

In addition, if the following condition (6)' is satisfied, the above effect is better achieved.

$$8 < |(TA/L2R1) \cdot \tan(\omega)| \quad (6)'$$

The lens system according to one of the first to seventh exemplary embodiments preferably satisfies the following condition (7).

$$5.50 < (TA/f) \cdot Fno < 9.50 \quad (7)$$

where

Fno is an F-number of the lens system.

The condition (7) prescribes ratios of the total optical length to the focal length of the entire lens system and the F-number of the lens system. If the lens system according to one of the first to seventh exemplary embodiments satisfies the condition (7), the lens system can be made small, and at the same time, a fast lens system can be obtained. If an upper limit of the condition (7) is exceeded, the power of the lens system is so strong that it is difficult to prevent or reduce occurrence of spherical aberration. On the other hand, if a lower limit of the condition (7) is exceeded, the power of lens system becomes so weak that it is difficult to achieve a wider angle. In addition, it is difficult to control field curvature.

In addition, if the following condition (7)' is satisfied, the above effect is better achieved.

$$6.00 < (TA/f) \cdot Fno < 8.50 \quad (7)'$$

The lens system according to one of the first to seventh exemplary embodiments preferably satisfies the following condition (8).

$$0.20 < |f/f1| < 0.55 \quad (8)$$

where f1 is a focal length of the first lens element.

The condition (8) prescribes a ratio of the focal length of the entire lens system to the focal length of first lens element L1. If the lens system according to one of the first to seventh exemplary embodiments satisfies the condition (8), the power of the lens system can be appropriately set, so that coma aberration and field curvature are easily controlled. If an upper limit of the condition (8) is exceeded, the power of first lens element L1 becomes so strong that it is difficult to prevent or reduce occurrence of field curvature. On the other hand, if a lower limit of the condition (8) is exceeded, the power of first lens element L1 becomes so weak that it is difficult to control coma aberration, so that the imaging performance decreases.

In addition, if the following condition (8)' is satisfied, the above effect is better achieved.

$$0.22 < |f/f1| < 0.50 \quad (8)'$$

The lens system according to one of the first to seventh exemplary embodiments preferably satisfies the following condition (9).

$$0.05 < |f/f2| < 0.19 \quad (9)$$

where f2 is a focal length of the second lens element.

The condition (9) prescribes a ratio of the focal length of the entire lens system to the focal length of second lens element L2. If the lens system according to one of the first to seventh exemplary embodiments satisfies the condition (9), the power of the lens system can be appropriately set, so that coma aberration is easily controlled. If an upper limit of the condition (9) is exceeded, the power of second lens element L2 becomes so strong that it is difficult to prevent or reduce occurrence of coma aberration, because the curvature of the image plane side surface of second lens element L2 becomes large. On the other hand, if a lower limit of the condition (9) is exceeded, the power of second lens element L2 becomes so weak that it is difficult to control coma aberration, so that the imaging performance decreases.

In addition, if the following condition (9)' is satisfied, the above effect is better achieved.

$$0.06<|f/f2|<0.18 \quad (9)'$$

The lens system according to one of the first to seventh exemplary embodiments preferably satisfies the following condition (10).

$$0.20<|f/f3|<0.7 \quad (10)$$

where
f3 is a focal length of the third lens element.

The condition (10) prescribes a ratio of the focal length of the entire lens system to the focal length of third lens element L3. If the lens system according to one of the first to seventh exemplary embodiments satisfies the condition (10), the power of the lens system can be appropriately set, so that spherical aberration and coma aberration are easily controlled. If an upper limit of the condition (10) is exceeded, the power of third lens element L3 becomes so strong that it is difficult to prevent or reduce occurrence of coma aberration, because the curvature of the image plane side surface of third lens element L3 becomes large. On the other hand, if a lower limit of the condition (10) is exceeded, the power of third lens element L3 becomes so small that it is difficult to control spherical aberration.

In addition, if the following condition (10)' is satisfied, the above effect is better achieved.

$$0.22<|f/f3|<0.65 \quad (10)'$$

The lens system according to one of the first to seventh exemplary embodiments preferably satisfies the following condition (11).

$$1.80<|TA/f1|<5.00 \quad (11)$$

The condition (11) prescribes a ratio of the total optical length of the lens system to the focal length of first lens element L1. If the lens system according to one of the first to seventh exemplary embodiments satisfies the condition (11), the power of the lens system can be appropriately set, so that field curvature is easily controlled. If an upper limit of the condition (11) is exceeded, the power of first lens element L1 so strong that it is difficult to prevent or reduce occurrence of coma aberration. In addition, miniaturization is difficult. On the other hand, if a lower limit of the condition (11) is exceeded, the power of first lens element L1 becomes small, so that it is difficult to prevent or reduce occurrence of field curvature.

In addition, if the following condition (11)' is satisfied, the above effect is better achieved.

$$2.00<|TA/f1|<4.50 \quad (11)'$$

The lens system according to one of the first to seventh exemplary embodiments preferably satisfies the following condition (12).

$$1.30<BF/IH<2.50 \quad (12)$$

The condition (12) prescribes a ratio of the back focus to the image height of the lens system. If the lens system according to one of the first to seventh exemplary embodiments satisfies the condition (12), the back focus can be reasonable for the lens system, so that field curvature is easily controlled. If an upper limit of the condition (12) is exceeded, the image height of the lens system is so low that a pixel number of image, when a photographing system is configured, decreases; therefore, it is necessary to make the lens system larger to obtain a comparable pixel number. If a lower limit of the condition (12) is exceeded, the back focus becomes so short that the power of the lens system becomes strong; therefore, it is difficult to prevent or reduce occurrence of field curvature.

In addition, if the following condition (12)' is satisfied, the above effect is better achieved.

$$1.32<BF/IH<2.10 \quad (12)'$$

The lens system according to one of the first to seventh exemplary embodiments preferably satisfies the following condition (13).

$$1.80<L1SD/TL1<10.0 \quad (13)$$

The condition (13) prescribes a ratio of the effective diameter to the central thickness of first lens element L1. If the lens system according to one of the first to seventh exemplary embodiments satisfies the condition (13), a power of first lens element L1 can be appropriately set, and first lens element L1 can be miniaturized. If an upper limit of the condition (13) is exceeded, the power of first lens element L1 becomes so strong that it is difficult to miniaturize first lens element. On the other hand, if a lower limit of the condition (13) is exceeded, the power of first lens element L1 becomes so small that it is difficult to prevent or reduce occurrence of field curvature.

In addition, if the following condition (13)' is satisfied, the above effect is better achieved.

$$2.00<L1SD/TL1<8.5 \quad (13)'$$

Eighth Exemplary Embodiment

FIG. 15 is a schematic configuration diagram of digital camera system 100 that is mounted with the lens system according to any one of the first to seventh exemplary embodiments.

Digital camera system 100 according to the present exemplary embodiment includes: camera body 101; and interchangeable lens device 201 that is detachably connected to camera body 101. Digital camera system 100 is an example of the camera system.

Camera body 101 includes: imaging device 102 that receives an optical image formed by lens system 202 of interchangeable lens device 201 and converts the optical image into an electric image signal; and liquid crystal monitor 103 that displays the image signal having been converted by imaging device 102; and camera-side mount 104. On the other hand, interchangeable lens device 201 includes: lens system 202 according to any one of the first to seventh exemplary embodiments; lens barrel 203 that holds lens system 202; lens-side mount 204 that is connected to camera-side mount 104 of camera body 101. Camera-side mount 104 and lens-side mount 204 function not only for physical connection but also as interfaces through which a controller (not shown) in camera body 101 and a controller (not shown) in interchangeable lens device 201 are electrically connected and which enable mutual signal exchange between the controllers. Note that FIG. 15 illustrates a case where the lens system according to the first exemplary embodiment is used as lens system 202.

In the present exemplary embodiment, since lens system 202 according to any one of the first to seventh exemplary embodiments is used, it is possible to realize, at low cost, an interchangeable lens device that is compact and excellent in imaging performance. In addition, it is possible to achieve miniaturization of the entire camera system and lower cost.

As described above, the exemplary embodiments have been described as examples of the techniques disclosed in the present application. However, the techniques of the present disclosure can be applied not only to the above exemplary embodiments but also to exemplary embodiments in which modification, replacement, addition, or removal is appropriately made.

In the first to seventh exemplary embodiments, front group GF is configured with two lens elements; however, front group GF is not limited to this configuration. Specifically, it is possible to configure second lens element L2 with a cemented lens of two lens elements and to thus configure front group GF with three lens elements.

Hereinafter, a description will be given on numerical examples implemented in the lens systems according to the first to seventh exemplary embodiments. Note that in the numerical examples, the lengths in the data are all in the unit of "mm", and the angles of view are all in the unit of "°", i.e., "degrees". In each of the numerical examples, r represents a radius of curvature, d represents a surface separation, nd represents a refractive index with respect to d-line, and y represents an effective radius. Further, in the numerical examples, the surfaces marked with * are aspherical, and the aspherical shapes are defined by the following equation.

$$Z = \frac{h^2/r}{1+\sqrt{1-(1+\kappa)(h/r)^2}} + \sum A_n h^n$$

[Mathematical Expression 1]

where

Z is a distance from a point on the aspherical surface whose height from the optical axis is h to a tangent plane at a top of the aspherical surface, h is a height from the optical axis, r is a radius of curvature of the top, κ is a conical coefficient, and $A_n$ is an n-th order aspherical surface coefficient.

FIGS. 2, 4, 6, 8, 10, 12, and 14 are each a longitudinal aberration diagram of the lens system according to each of the first to seventh numerical examples in the infinity focusing state.

In each longitudinal aberration diagram, in order from the left side, there are shown a spherical aberration (SA (mm)), an astigmatism (AST (mm)), and a distortion (DIS (%)). In each spherical aberration diagram, the vertical axis represents the F-number. The solid line, the short-broken line, and the long-broken line respectively represent the characteristics for far-infrared light of the wavelength of 10 μm, the wavelength of 12 μm, and the wavelength of 8 μm. In each astigmatism diagram, the vertical axis represents the image height. The broken line and the solid line respectively represent the characteristics in the sagittal plane (represented by s, in the drawing) and in the meridional plane (represented by m, in the drawing). In each distortion diagram, the vertical axis represents the image height.

First Numerical Example

The lens system according to the first numerical example corresponds to the first exemplary embodiment shown in FIG. 1. Regarding the lens system of the first numerical example, Table 1 shows the surface data, Table 2 shows the aspherical data, and Table 3 shows various kinds of data in the infinity focusing state.

TABLE 1

| Surface number | r | d | nd | Y |
|---|---|---|---|---|
| Object plane | ∞ | Variable | | |
| 1 | 20.05 | 3.00 | 2.585 | 9.48 |
| 2* | 7.19 | 5.27 | | 5.56 |
| 3* | −16.06 | 3.40 | 2.585 | 4.04 |
| 4* | −14.04 | 2.88 | | 4.45 |
| 5 (Aperture stop) | 0.00 | 0.39 | | 4.20 |
| 6* | 31.40 | 6.08 | 2.585 | 4.67 |
| 7* | −12.60 | 5.50 | | 5.66 |
| 8 | 0.00 | 1.00 | 4.0031 | 4.28 |
| 9 | 0.00 | 0.93 | | |
| Image plane | | | | |

TABLE 2

2nd surface
  K = 0.00000E+00, A4 = 2.87634E−04, A6 = −1.70000E−05,
  A8 = 1.00000E−06, A10 = −2.35619E−08, A12 = −5.28028E−28
3rd surface
  K = 4.95893E+00, A4 = −7.12178E−04, A6 = −1.00000E−05,
  A8 = −2.22300E−07, A10 = 2.66781E−08, A12 = 0.00000E+00
4th surface
  K = 0.00000E+00, A4 = −2.63056E−04, A6 = 1.40000E−05,
  A8 = −1.00000E−06, A10 = 4.79774E−08, A12 = 0.00000E
6th surface
  K = 0.00000E+00, A4 = −2.92952E−04, A6 = 1.00000E−06,
  A8 = 0.00000E+00, A10 = 0.00000E+00, A12 = 0.00000E+00
7th surface
  K = 0.00000E+00, A4 = 9.40000E−05, A6 = −3.00000E−06,
  A8 = 6.96572E−08, A10 = −7.50489E−10, A12 = 0.00000E+00

TABLE 3

| Focal length | 3.365 |
|---|---|
| F-number | 0.961802 |
| Half angle of view | 92 |
| Image height | 4.07352 |
| Total lens length | 28.4567 |

Second Numerical Example

The lens system according to the second numerical example corresponds to the second exemplary embodiment shown in FIG. 3. Regarding the lens system of the second numerical example, Table 4 shows the surface data, Table 5 shows the aspherical data, and Table 6 shows various kinds of data in the infinity focusing state.

TABLE 4

| Surface number | r | d | nd | Y |
|---|---|---|---|---|
| Object plane | ∞ | Variable | | |
| 1 | 19.420 | 2.40 | 2.585 | 11.14 |
| 2 | 10.000 | 5.29 | | 7.70 |
| 3 | −73.156 | 2.00 | 2.585 | 5.16 |
| 4* | 66.575 | 6.50 | | 4.39 |
| 5 (Aperture stop) | 0.000 | 0.38 | | 4.70 |
| 6* | 16.813 | 6.63 | 2.585 | 6.26 |
| 7* | −17.328 | 6.25 | | 6.30 |
| 8 | 0.000 | 1.00 | 4.0031 | 4.36 |
| 9 | 0.000 | 1.01 | | |
| Image plane | | | | |

TABLE 5

4th surface
K = 0.00000E+00, A4 = 1.95278E−04, A6 = 5.60000E−05,
A8 = −4.00000E−06, A10 = 1.22029E−07, A12 = 0.00000E+00
5th surface
K = 0.00000E+00, A4 = −1.23379E−04, A6 = 2.00000E−06,
A8 = 0.00000E+00, A10 = 0.00000E+00, A12 = 0.00000E+00
6th surface
K = 0.00000E+00, A4 = 1.88951E−04, A6 = −1.00000E−06,
A8 = 4.86328E−08, A10 = −2.80985E−10, A12 = 0.00000E+00

TABLE 6

| | |
|---|---|
| Focal length | 3.79094 |
| F-number | 0.97536 |
| Half angle of view | 92 |
| Image height | 4.08386 |
| Total lens length | 31.4615 |

Third Numerical Example

The lens system according to the third numerical example corresponds to the third exemplary embodiment shown in FIG. 5. Regarding the lens system of the third numerical example, Table 7 shows the surface data, Table 8 shows the aspherical data, and Table 9 shows various kinds of data in the infinity focusing state.

TABLE 7

| Surface number | r | d | nd | Y |
|---|---|---|---|---|
| Object plane | ∞ | Variable | | |
| 1 | 11.591 | 1.00 | 2.585 | 7.55 |
| 2* | 6.120 | 6.57 | | 5.72 |
| 3 | −12.326 | 3.00 | 2.585 | 5.51 |
| 4 | −11.500 | 4.40 | | 6.19 |
| 5 (Aperture stop) | 0.000 | 1.70 | | 4.71 |
| 6* | 9.952 | 1.80 | 2.585 | 5.36 |
| 7 | 15.611 | 3.89 | | 5.14 |
| 8 | 10.699 | 1.91 | 2.585 | 5.31 |
| 9* | 38.812 | 3.47 | | 4.97 |
| 10 | 0.000 | 1.00 | 4.0031 | 4.33 |
| 11 | 0.000 | 0.85 | | |
| Image plane | | | | |

TABLE 8

2nd surface
K = 0.00000E+00, A4 = 4.87138E−04, A6 = −4.80000E−05,
A8 = 3.00000E−06, A10 = −7.84573E−08, A12 = 0.00000E+00
6th surface
K = 0.00000E+00, A4 = −6.10000E−05, A6 = 3.00000E−06,
A8 = −1.85874E−07, A10 = 5.28598E−09, A12 = −5.15391E−11
9th surface
K = 0.00000E+00, A4 = 4.68593E−04, A6 = −3.80000E−05,
A8 = 4.00000E−06, A10 = −1.47073E−07, A12 = 2.33941E−09

TABLE 9

| | |
|---|---|
| Focal length | 3.35524 |
| F-number | 0.832 |
| Half angle of view | 89.5074 |
| Image height | 4.08 |
| Total lens length | 29.5915 |

Fourth Numerical Example

The lens system according to the fourth numerical example corresponds to the fourth exemplary embodiment shown in FIG. 7. Regarding the lens system of the fourth numerical example, Table 10 shows the surface data, Table 11 shows the aspherical data, and Table 12 shows various kinds of data in the infinity focusing state.

TABLE 10

| Surface number | r | d | nd | Y |
|---|---|---|---|---|
| Object plane | ∞ | Variable | | |
| 1 | 20.050 | 3.000 | 2.585 | 10.02 |
| 2* | 8.741 | 6.306 | | 6.69 |
| 3 | −19.673 | 3.400 | 2.585 | 5.08 |
| 4* | −18.101 | 5.572 | | 4.95 |
| 5 (Aperture stop) | 0.000 | 0.392 | | 4.40 |
| 6* | 15.832 | 6.080 | 2.585 | 5.45 |
| 7* | −25.806 | 5.500 | | 4.90 |
| 8 | 0.000 | 1.000 | 4.0031 | 4.19 |
| 9 | 0.000 | 0.850 | | |
| Image plane | | | | |

TABLE 11

2nd surface
K = 0.00000E+00, A4 = 1.29912E−04, A6 = −4.00000E−06,
A8 = 1.64946E−07, A10 = −2.56654E−09, A12 = −6.45713E−24
4th surface
K = 0.00000E+00, A4 = 1.45860E−04, A6 = 1.60000E−05,
A8 = −1.00000E−06, A10 = 2.42182E−08, A12 = 0.00000E+00
6th surface
K = 0.00000E+00, A4 = 4.50000E−05, A6 = 4.00000E−06,
A8 = 0.00000E+00, A10 = 0.00000E+00, A12 = 0.00000E+00
7th surface
K = 0.00000E+00, A4 = 2.84459E−04, A6 = 6.00000E−06,
A8 = −1.57157E−07, A10 = 8.96003E−09, A12 = 0.00000E+00

TABLE 12

| | |
|---|---|
| Focal length | 3.94832 |
| F-number | 1.01847 |
| Half angle of view | 66 |
| Image height | 4.07992 |
| Total lens length | 32.0998 |

Fifth Numerical Example

The lens system according to the fifth numerical example corresponds to the fifth exemplary embodiment shown in FIG. 9. Regarding the lens system of the fifth numerical example, Table 13 shows the surface data, Table 14 shows the aspherical data, and Table 15 shows various kinds of data in the infinity focusing state.

TABLE 13

| Surface number | r | d | nd | Y |
|---|---|---|---|---|
| Object plane | ∞ | Variable | | |
| 1 | 20.050 | 4.731 | 2.760 | 11.00 |
| 2* | 8.631 | 4.900 | | 5.83 |
| 3* | −14.348 | 3.201 | 2.585 | 3.80 |
| 4* | −12.947 | 2.140 | | 4.32 |
| 5 (Aperture stop) | 0.000 | 0.392 | | 3.80 |
| 6* | 20.709 | 6.080 | 2.585 | 4.60 |
| 7* | −15.032 | 4.755 | | 5.14 |
| 8 | 0.000 | 1.000 | 4.0031 | 4.44 |
| 9 | 0.000 | 0.948 | | |
| Image plane | | | | |

TABLE 14

2nd surface
K = 0.00000E+00, A4 = 3.99530E−04, A6 = −2.10000E−05,
A8 = 1.00000E−06, A10 = −2.02517E−08, A12 = −5.28028E−28
3rd surface
K = 8.24774E+00, A4 = −7.46498E−04, A6 = −1.60000E−05,
A8 = 2.3712E−07, A10 = 2.19595E−08, A12 = 0.00000E+00
4th surface
K = 0.00000E+00, A4 = −4.44402E−04, A6 = 1.50000E−05,
A8 = −1.00000E−06, A10 = 3.60309E−08, A12 = 0.00000E+00
6th surface
K = 0.00000E+00, A4 = −2.12681E−04, A6 = 6.00000E−06,
A8 = 0.00000E+00, A10 = 0.00000E+00, A12 = 0.00000E+00
7th surface
K = 0.00000E+00, A4 = 1.27192E−04, A6 = −1.30261E−07,
A8 = 1.12378E−07, A10 = −1.92002E−09, A12 = 0.00000E+00

TABLE 15

| Focal length | 4.16686 |
|---|---|
| F-number | 1.00862 |
| Half angle of view | 92 |
| Image height | 4.57587 |
| Total lens length | 28.1485 |

Sixth Numerical Example

The lens system according to the sixth numerical example corresponds to the sixth exemplary embodiment shown in FIG. 11. Regarding the lens system of the sixth numerical example, Table 16 shows the surface data, Table 17 shows the aspherical data, and Table 18 shows various kinds of data in the infinity focusing state.

TABLE 16

| Surface number | r | d | nd | Y |
|---|---|---|---|---|
| Object plane | ∞ | Variable | | |
| 1 | 20.050 | 3.000 | 2.585 | 9.91 |
| 2* | 7.630 | 5.643 | | 5.90 |
| 3* | −20.028 | 2.765 | 2.585 | 3.59 |
| 4* | −17.890 | 1.657 | | 3.89 |
| 5 (Aperture stop) | 0.000 | 0.392 | | 3.80 |
| 6* | 31.986 | 6.080 | 2.585 | 4.43 |
| 7* | −11.722 | 5.705 | | 5.06 |
| 8 | 0.000 | 1.000 | 4.0031 | 4.46 |
| 9 | 0.000 | 0.850 | | |
| Image plane | | | | |

TABLE 17

2nd surface
K = 0.00000E+00, A4 = 4.48478E−04, A6 = −2.90000E−05,
A8 = 1.00000E−06, A10 = −2.21363E−08, A12 = −5.28027E−28
3rd surface
K = 2.46224E+01, A4 = −9.49989E−04, A6 = −6.00000E−06,
A8 = −4.16808E−07, A10 = 1.19020E−07, A12 = 7.94370E−34
4th surface
K = 0.00000E+00, A4 = −5.24714E−04, A6 = 8.00000E−06,
A8 = 3.71660E−07, A10 = 3.26879E−08, A12 = 0.00000E+00
6th surface
K = 0.00000E+00, A4 = −2.30328E−04, A6 = 1.20000E−05,
A8 = 0.00000E+00, A10 = 0.00000E+00, A12 = 0.00000E+00
7th surface
K = 0.00000E+00, A4 = 1.84340E−04, A6 = 1.00000E−06,
A8 = 3.53853E−08, A10 = 3.10513E−09, A12 = 0.00000E+00

TABLE 18

| Focal length | 3.6353 |
|---|---|
| F-number | 1.06162 |
| Half angle of view | 92 |
| Image height | 4.47951 |
| Total lens length | 27.0915 |

Seventh Numerical Example

The lens system according to the seventh numerical example corresponds to the seventh exemplary embodiment shown in FIG. 13. Regarding the lens system of the seventh numerical example, Table 19 shows the surface data, Table 20 shows the aspherical data, and Table 21 shows various kinds of data in the infinity focusing state.

TABLE 19

| Surface number | r | d | nd | Y |
|---|---|---|---|---|
| Object plane | ∞ | Variable | | |
| 1 | 17.085 | 4.443 | 3.220 | 9.93 |
| 2* | 6.622 | 5.478 | | 5.05 |
| 3* | −39.871 | 3.235 | 2.585 | 3.39 |
| 4* | −21.810 | 0.865 | | 3.68 |
| 5 (Aperture stop) | 0.000 | 0.715 | | 3.60 |
| 6* | 34.496 | 6.205 | 2.585 | 4.47 |
| 7* | −10.622 | 5.200 | | 5.10 |
| 8 | 0.000 | 1.000 | 4.0031 | 4.18 |
| 9 | 0.000 | 0.850 | | |
| Image plane | | | | |

TABLE 20

2nd surface
K = 0.00000E+00, A4 = 4.41854E−04, A6 = −1.30000E−05,
A8 = 2.00000E−06, A10 = −3.11490E−08, A12 = −4.22343E−28
3rd surface
K = 4.49469E+01. A4 = −7.04865E−04, A6 = −9.10000E−05
A8 = 1.20000E−05, A10 = −1.00000E−06, A12 = 0.00000E+00
4th surface
K= 0.00000E+00, A4 = −2.06316E−04, A6 = 7.00000E−06,
A8 = −2.61284E−07, A10 = 1.02688E−08, A12 = 0.00000E
6th surface
K = 0.00000E+00, A4 = −1.30609E−04, A6 = 8.00000E−06,
A8 = 0.00000E+00, A10 = 0.00000E+00, A12 = 0.00000E+00
7th surface
K = 0.00000E+00, A4 = 2.26991E−04, A6 = 1.10000E−05,
A8 = −1.00000E−06, A10 = 1.28209E−08, A12 = 0.00000E+00

TABLE 21

| Focal length | 3.23143 |
|---|---|
| F-number | 1.00873 |
| Half angle of view | 92 |
| Image height | 4.07651 |
| Total lens length | 27.9881 |

Below are values corresponding to the conditions to which the values in the numerical examples are applied.

TABLE 22

| | Condition | Numerical example | | | | | | |
|---|---|---|---|---|---|---|---|---|
| | | 1 | 2 | 3 | 4 | 5 | 6 | 7 |
| (1) | |(TL1/TA) · tan (ω)| | 3.017 | 2.185 | 3.917 | 0.209 | 5.410 | 3.158 | 4.529 |
| (2) | IH/TA | 0.143 | 0.130 | 0.137 | 0.127 | 0.162 | 0.164 | 0.145 |
| (3) | n | 2.585 | 2.585 | 2.585 | 2.585 | 2.760 | 2.585 | 3.220 |
| (4) | IH/L1SD | 0.430 | 0.367 | 0.540 | 0.410 | 0.416 | 0.451 | 0.411 |
| (5) | BF/f | 2.214 | 2.176 | 1.615 | 1.887 | 1.609 | 2.078 | 2.095 |
| (6) | |(TA/L2R1) · tan (ω)| | 113.331 | 90.062 | 564.273 | 8.274 | 93.858 | 102.082 | 121.482 |
| (7) | (TA/f) · Fno | 8.138 | 8.092 | 7.363 | 8.306 | 6.450 | 7.943 | 8.420 |
| (8) | |f/f1| | 0.407 | 0.246 | 0.364 | 0.338 | 0.356 | 0.398 | 0.489 |
| (9) | |f/f2| | 0.097 | 0.174 | 0.100 | 0.064 | 0.120 | 0.062 | 0.123 |
| (10) | |f/f3| | 0.543 | 0.620 | 0.232 | 0.581 | 0.679 | 0.614 | 0.601 |
| (11) | |TA/f1| | 3.446 | 2.040 | 3.223 | 2.758 | 2.417 | 2.982 | 4.079 |
| (12) | BF/IH | 1.829 | 2.020 | 1.328 | 1.826 | 1.465 | 1.690 | 1.729 |
| (13) | L1SD/TL1 | 3.160 | 4.641 | 7.554 | 3.319 | 2.057 | 3.304 | 2.235 |

INDUSTRIAL APPLICABILITY

The present disclosure can be applied to an image projection device such as a projector, a digital still camera, a digital video camera, a surveillance camera in a surveillance system, a web camera, an on-vehicle camera, and the like. In particular, the present disclosure can be applied to an imaging optical system for a digital still camera system and a digital video camera system that use far-infrared light in a wavelength range from 8 μm to 12 μm and have a wide angle of view.

REFERENCE MARKS IN THE DRAWINGS

GF: front group
GR: rear group
L1: first lens element
L2: second lens element
L3: third lens element
L4: fourth lens element
A: aperture stop
P: parallel plate
S: image plane
100: digital camera system
101: camera body
102: imaging device
103: liquid crystal monitor
104: camera-side mount
201: interchangeable lens device
202: lens system
203: lens barrel
204: lens-side mount

The invention claimed is:

1. A lens system comprising, in order from an object side to an image plane side:
   a first lens element having a negative power;
   a second lens element having a concave surface facing the object side; and
   a third lens element having a positive power,
   wherein the lens system satisfies conditions (1), (2), and (7):

$$0.205 < |(TL1/TA) \cdot \tan(\omega)| \qquad (1);$$

$$0.120 < IH/TA < 0.170 \qquad (2); \text{ and}$$

$$5.50 < (TA/f) \cdot Fno < 9.50 \qquad (7),$$

where
   TL1 is a central thickness of the first lens element,
   TA is a total optical length of an entire lens system,
   ω is a maximum half angle of view,
   IH is a maximum image height of the lens system,
   f is a focal length of the entire lens system, and
   Fno is an F-number of the lens system.

* * * * *